S. F. ALDEN AND H. C. EDDY.
PROCESS AND APPARATUS FOR REFINING LIQUID MIXTURES.
APPLICATION FILED DEC. 23, 1916.
1,394,462. Patented Oct. 18, 1921.
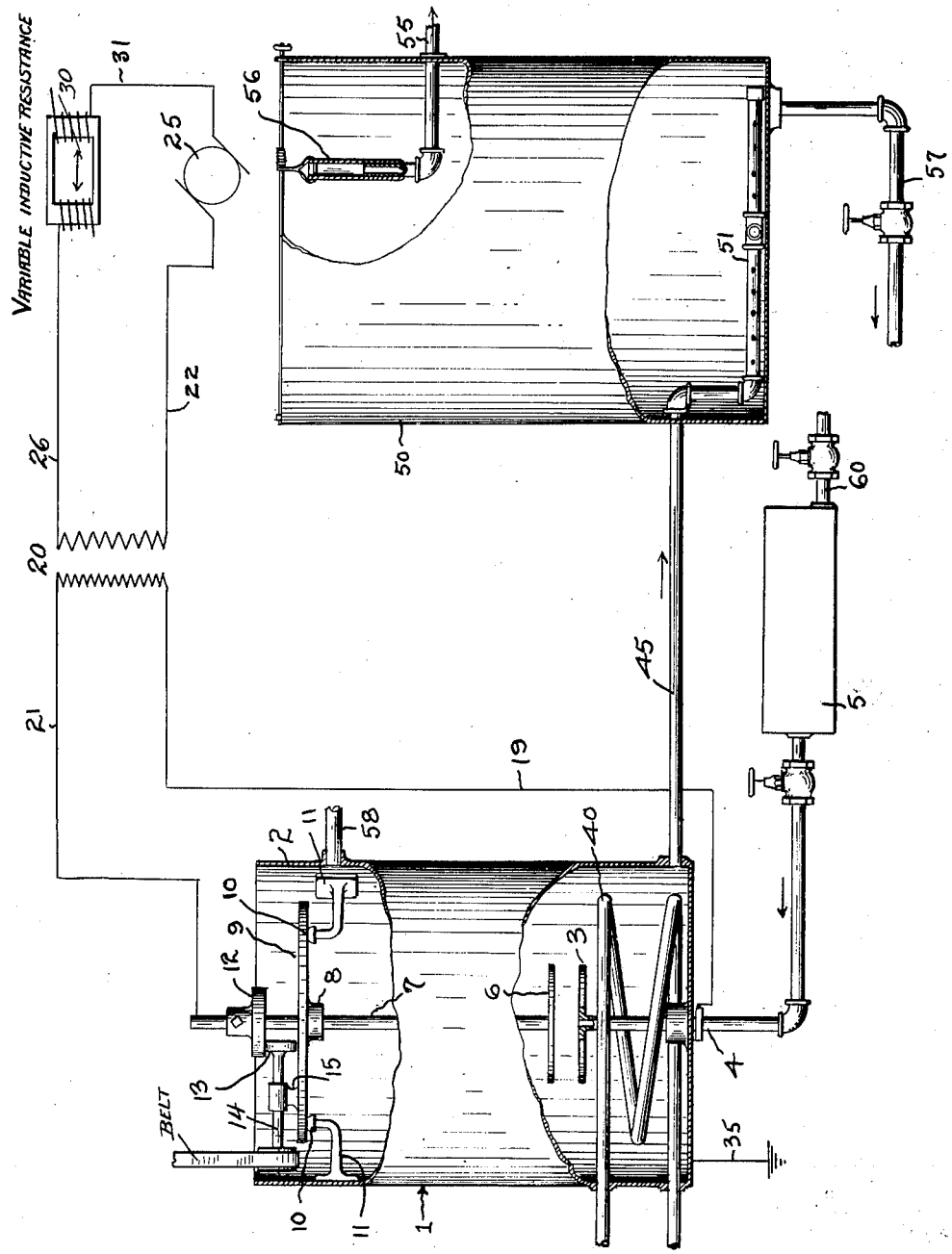
WITNESSES:
INVENTORS
Seth F. Alden
Harold C. Eddy
BY John H. Miller
ATTORNEY.

UNITED STATES PATENT OFFICE.

SETH FRANK ALDEN, OF SAN FRANCISCO, AND HAROLD C. EDDY, OF LOS ANGELES, CALIFORNIA; SAID EDDY ASSIGNOR TO PETROLEUM RECTIFYING COMPANY OF CALIFORNIA, A CORPORATION OF CALIFORNIA.

PROCESS AND APPARATUS FOR REFINING LIQUID MIXTURES.

1,394,462.   Specification of Letters Patent.   Patented Oct. 18, 1921.

Application filed December 23, 1916. Serial No. 138,621.

*To all whom it may concern:*

Be it known that we, SETH FRANK ALDEN, a resident of the city and county of San Francisco, State of California, and HAROLD C. EDDY, of the city of Los Angeles, county of Los Angeles, and State of California, have made a new and useful invention—to wit, Processes and Apparatus for Refining Liquid Mixtures; and we do hereby declare the following to be a full, clear, concise, and exact description of the same.

Our invention is a new and improved process and apparatus for refining liquid mixtures.

The invention is adapted to break up liquid mixtures or emulsion and to separate the component liquids of such mixtures.

The invention contemplates a novel application of electricity to the liquid mixtures for the accomplishment of its desired results.

The liquid mixtures to which the invention may be applied contain a liquid which is normally a non-conductor of electricity.

The invention is particularly applicable to the refinement of oil emulsions which are normally non-conductors of electricity. In certain of these oil emulsions, the sludge or water may be present in various forms.

Certain liquid mixtures, such as oil emulsions, above referred to, are practically non-conductors when subjected to relatively low difference of potential. If however, the difference of potential to which such mixtures are subjected be increased beyond a certain degree, the electromotive force is sufficient to overcome the dielectric resistance and current passes through the mixture. If the difference of potential be then sufficiently decreased, the insulating conditions are restored, and the mixture again acts substantially as a non-conductor, while still subject to the electrical stresses, probably in large part electrostatic, due to the maintained electrical charge in the electrodes.

Whatever be the cause, we have found that as the result of subjecting the mixture or emulsion, such as crude emulsified petroleum to these repeated and successive actions, the emulsion is broken down and the water or sludge and oil will separate by gravity.

Our invention therefore comprises a process and apparatus of producing an electrical field within the mixture or emulsion itself between two electrodes immersed in said mixture or emulsion, and comprises repeatedly and successively increasing the intensity of the field until the mixture conducts current and then decreasing the intensity of the field to such an extent that the mixture again acts as a non-conductor of electricity. The result of these variations of electrical effect on the mixture or emulsion is such that the different liquids will separate from each other after passing through the thus varied electrical field; whereas, before such treatment the water and oil would not so separate.

In our process the mixture is caused to flow continuously between two electrodes, the separation of the two liquids being effected in a chamber which may be within or separate and apart from the treater proper.

In our process, heating the mixture, either prior to or at the time of treating, enables regulation of the electric resistance of the mixture, whereby the commercial treatment of various mixtures differing widely in physical and chemical properties, and accordingly in resistance, is facilitated, and more uniform results are accomplished.

In the following description and in the accompanying drawing we have described and illustrated one form of apparatus by means of which our process may be carried out on a commercial scale. We do not, however, limit our invention to the employment of this particular apparatus as other apparatuses may be employed to carry out our process.

The figure in the drawing is a diagrammatic view of an apparatus embodying our invention.

In the drawing 1 indicates generally a treater which includes a vessel 2 for containing the liquid mixture which is treated. In the lower portion of the vessel is arranged an electrode 3 which is supported upon the upper end of a pipe 4 leading from a receptacle 5 through the bottom of the vessel 2 and through the electrode. Another electrode 6 is suspended on a rod 7 above electrode 3, which rod extends upwardly in the vessel 2 through bearing 8 on a plate 9, which plate rests upon and is insulated by insulators 10 on brackets 11 secured to the vessel 2 at the top thereof. A collar 12 is secured to the upper portion of rod 7 above the plate 9 and rests upon a cam 13 on a shaft 14 journaled in bearing 15 on the top of the plate 9, whereby the rod 7 and electrode 6 are supported and said electrode maintained in electrical relation to the electrode 3. Rotation of the shaft 14 as by a belt 14' and pulley 14 causes the cam 13 to raise and lower the collar 12 and shaft 7 and to raise and lower the electrode 6 in electrical relation to the electrode 3 for the purpose of varying the distance and the electrical field between said electrodes. The electrode 3, through the pipe 4, is connected by lead 19 to one of the terminals of the secondary coil of a step-up transformer 20, the other terminal of which is connected by lead 21, through shaft 7, to electrode 6. The terminals of the primary coil of the transformer 20 are connected by lead 22 to one terminal of an electric generator 25, and by lead 26 to one terminal of a variable inductive reactance 30, the other terminal of the generator being connected by lead 31 to the other terminal of the reactance 30, thus completing the primary circuit. For safety the vessel 2 may be grounded as indicated at 35. A steam coil 40 is located in the bottom of the vessel 2, the ends of which coil extend through the walls of the vessel and are connected to a steam generator not shown, the purpose of the coil being to apply heat directly to the liquid mixture during treatment in the treater for a finer or more minute regulation of the refining operation of the process and apparatus. An outlet pipe 45 leads from the bottom of vessel 2 into the bottom of a settling tank 50 and terminates in a perforated distributing nozzle 51. An outlet pipe 55 leads from the settling tank 50 and has an adjustable sleeve 56 over its inner end within the tank, into which sleeve the liquid in the tank may flow in order to pass out through the outlet pipe until the level of the liquid in the tank corresponds to the top of the sleeve. By adjusting the sleeve up and down the level of the liquid in said tank may be determined and inasmuch as the vessel 2 communicates with tank 50 through pipe 45 the level of the liquid in said vessel may be correspondingly determined. An outlet pipe 57 leads from the bottom of this settling tank 50. An overflow pipe 58 leads from the vessel 2 below the insulators 10 to prevent the liquid mixture in the vessel from rising over the insulators. A supply pipe 60 leads into the receptacle 5 for supplying the liquid mixture to the receptacle.

The liquid which may for example be an oil emulsion is supplied through pipe 60 to the receptacle 5 from which it enters the vessel 2 through the pipe 4, passing therefrom between the electrodes 3 and 6 and spreading out horizontally in every direction.

The oil may, if desired, be heated within the tank by the heating coil 40. By rotating the shaft 14 the cam 13 raises and lowers the rod 7 and its attached electrode 6 thereby causing said electrode to move toward and from the electrode 3.

The distance between these two electrodes is so proportioned with reference to the difference of potential maintained between the electrodes 6 and 3 that as these electrodes are brought closer together the intensity of the field is such as to permit a considerable flow of current through the emulsion; while when the electrode 6 is raised away from the electrode 3 the intensity of the field is diminished to such an extent that substantially no current can flow.

At the same time the relative motion of the electrode agitates the liquid in their vicinity.

Whatever be the cause we have found that as the result of this combined electrical action and mechanical movement, the component liquids of the mixture or emulsion are brought into such condition that they can and do separate by gravity. This gravity separation is effected either within the vessel itself or by allowing its contents to flow through the pipe 45 and then out through the perforations of the pipe 51 into the settling tank 50. In this tank the water or sludge separates at the bottom and the oil rises to the top. The electrically treated mixture therefore passes within the tank 50 up through a body of water, thereby promoting a mechanical coalescence of like liquid particles and the precipitation of suspended particles of foreign matter. The heavier liquid which when the mixture is an oily emulsion will be water is drawn off through the outlet pipe 57, while the lighter liquid, i. e. the oil, passes out of the tank through the sleeves 56 and outlet 55.

By adjustment of the sleeve 56 in the tank 50, the level of the liquid in the tank 2 may be regulated at such a height as to allow a considerable body of the non-conducting oily portion of the mixture to stand over the electrode 6, thereby preventing electric leakage across the surface of the mixture.

As illustrative examples of commercial practice, it was found that in treating a crude emulsified petroleum carrying 15% of water, a maintained difference of potential of 9000 volts was required, while the distance between the electrodes was varied from two to six inches. In another case, where the emulsion contained 70% of water, a voltage of 3700 volts was sufficient.

Having thus described our invention, what we claim as new and desire to protect by Letters Patent is:

1. The process of separating the component liquids of a liquid mixture, such as an oil-water emulsion, which comprises maintaining an electric field between electrodes immersed in said mixture, alternately increasing the intensity of the field, sufficiently to cause current to flow through the mixture, and decreasing the intensity of the field, sufficiently to substantially prevent passage of current, and separating the coalesced like particles into distinct liquids.

2. The process as claimed in claim 1 in which the variations of field intensity are effected by varying the distance between the electrodes.

3. The process as claimed in claim 1 in which a continuous flow of the mixture or emulsion between the electrodes is maintained.

4. An apparatus for separating liquid mixtures or emulsions comprising a tank, spaced electrodes within said tank, means for maintaining such electrodes at different electrical potentials, and means for imparting to said electrodes a reciprocatory motion toward and away from each other.

5. An apparatus as claimed in claim 4 in which one electrode is fixed and the other movable.

6. An apparatus as claimed in claim 4 in which a conduit is arranged to deliver the mixture between the electrodes.

7. An apparatus as claimed in claim 4 in which the fixed electrode is below the movable electrode and the upper electrode is movable toward and away from the lower electrode.

8. A process of dehydrating emulsions which consists in impressing an electrical potential on electrodes immersed in the emulsion; causing the electrodes to approach each other to a sufficient degree to cause water chains to be formed between the electrodes through which heavy short circuit currents can flow; and thereafter breaking said chains and interrupting said currents by separating said electrodes.

9. An apparatus for dehydrating emulsions comprising a containing vessel; a lower electrode fixed in said containing vessel; an upper electrode suspended over said lower electrode and movable vertically with relation thereto; means for impressing an electromotive force between said electrodes; and means for moving said upper electrode vertically toward and away from said lower electrode.

10. A process of dehydrating emulsions which consists in impressing an electrical potential on electrodes immersed in the emulsion; causing the electrodes to approach each other to a sufficient degree to cause current to flow through the emulsion; and thereafter interrupting said current by separating said electrodes.

In testimony whereof, I have hereunto set my hand at San Francisco, California, this ninth day of September, 1916.

SETH FRANK ALDEN.

In the presence of—
JOHN R. OBER,
P. S. PIDWELL.

In testimony whereof, I have hereunto set my hand at Los Angeles, county of Los Angeles, State of California, this 15th day of December, 1916.

HAROLD C. EDDY.

In the presence of—
BESSIE P. EDDY,
ORVILLE M. JORDAN.